United States Patent

[11] 3,612,870

[72] Inventor John F. Brennan
 Grosse Point, Mich.
[21] Appl. No. 756,856
[22] Filed Sept. 3, 1968
[45] Patented Oct. 12, 1971
[73] Assignees Vincent J. Brennan;
 Michael J. Brennan
 , part interest to each

[54] DOSIMETER AND METHOD FOR DETERMINING THE LEVEL OF RADIATION FROM AN ELECTRONIC APPARATUS HAVING A PLURALITY OF RADIATION EMITTING SURFACES
 7 Claims, 15 Drawing Figs.
[52] U.S. Cl. .................................................. 250/83,
 250/68, 250/105, 250/108
[51] Int. Cl. .................................................. G01t 1/08
[50] Field of Search .......................................... 250/66, 83
 PH, 83 CD, 108, 68, 105

[56] References Cited
UNITED STATES PATENTS
| | | | |
|---|---|---|---|
| 1,219,965 | 3/1917 | Leisenring .................... | 250/66 |
| 1,635,952 | 7/1927 | Pomeranz ...................... | 250/66 |
| 2,004,232 | 6/1935 | Weed ............................. | 250/66 |
| 2,624,846 | 1/1953 | Tochilin et al. ................ | 250/83 |
| 2,659,013 | 11/1953 | Davis et al. ................... | 250/83 |
| 2,848,625 | 8/1958 | Taplin et al. .................. | 250/83 |
| 3,051,837 | 8/1962 | Nitka ............................. | 250/83 |
| 3,390,269 | 6/1968 | Packard ........................ | 250/71.5 |

OTHER REFERENCES
Price et al., Radiation Shielding, Pergamon Press, 1957, pp. 7-8

Primary Examiner—James W. Lawrence
Assistant Examiner—Davis L. Willis
Attorney—Whittemore, Hulbert & Belknap ABSTRACT: The dosimeter is particularly useful in checking the amount of X-ray radiation from home television receivers to determine whether or not the receivers are safe. The dosimeter comprises a casing which contains a radiation sensitive film packet. A radiation screen is provided in front of the film packet. Means are provided to either move the screen or to move the film to selectively expose different portions of the film to radiation generated exteriorly of the casing.

The dosimeter may be used for determining the level of radiation from an electronic apparatus having a plurality of radiation-emitting surfaces. The dosimeter is first placed closely adjacent to one of the radiation-emitting surfaces. A portion of the film is then exposed to radiation from the surface for a predetermined time interval. The dosimeter is then selectively placed adjacent to each of the remaining radiation-emitting surfaces and other portions of the film are exposed to radiation for predetermined time intervals. The film is then developed and the amount of dosage received by each of the exposed portions is measured. The results of this measurement are compared with a standard to determine whether or not the radiation from the apparatus is within safe limits.

INVENTOR
JOHN F. BRENNAN

BY Whittemore, Hulbert & Belknap
ATTORNEYS

PATENTED OCT 12 1971 3,612,870

INVENTOR
JOHN F. BRENNAN

BY Whittemore Hulbert
& Belknap
ATTORNEYS

DOSIMETER AND METHOD FOR DETERMINING THE LEVEL OF RADIATION FROM AN ELECTRONIC APPARATUS HAVING A PLURALITY OF RADIATION EMITTING SURFACES

BACKGROUND OF THE INVENTION

It has been recently learned that home television receivers are capable of producing a dangerous level of X-ray radiation. This is particularly true of color television sets. There is currently no way for the homeowner to independently determine whether or not his television receiver is emitting dangerous radiation. The present invention provides a simple dosimeter and method for use to determine whether or not the home television set is safe.

In addition to the dangerous radiation produced by home television sets, there is an ever-increasing variety of electronic components being utilized in industrial, military and research facilities which may be capable of producing dangerous amounts of X-rays. For example, electronic components operated at high voltage such as controls, displays and radiofrequency communication and detection devices are capable of emitting X-rays of harmful intensity. Apparatus used to generate high-frequency, high-power radio and television waves, such as magnetrons and klystrons with accelerating voltages, commonly from 20 to 50 kilovolts, are regularly utilized in the communication industry. This equipment may be fixed or carried in airplanes, ships and land vehicles. High-voltage power supplies utilizing high-voltage rectifiers, regulator tubes, and thyratrons which frequently operate in the range of from 10 to 150 kilovolts find common usage. Electronic display tubes, such as projection television, cathode-ray tubes of the type used in oscilloscopes, usually use accelerating voltages of from 5 to 50 kilovolts while some go to 70 kilovolts. Electron linear accelerators, such as the "Van de Grauff" are becoming increasingly popular for use in industrial processes such as the polymerization of plastics as well as for industrial research. Twenty millivolts is a common design for these accelerators, but some have accelerating potentials above 10 kilovolts. There are some amateur scientific devices and toys which are being sold and which generate high voltages. For example, one electrostatic generator marketed as an amateur scientific device is said to be capable of producing 500,000 volts and is sold at a low price. In the hands of a technically competent but ill-advised student, this mechanism could easily be converted into a reasonably effective X-ray machine.

It will be appreciated from the above discussion that a desirable safety procedure in the use of such devices would be to check the radiation level when the device is new and to continue checking the radiation level at regular intervals. The present invention provides a relatively inexpensive dosimeter device and method for conducting such checks.

SUMMARY OF THE INVENTION

The dosimeter comprises a casing in which is mounted radiation sensitive film. A radiation screen is provided in front of the film. Means are provided to move one of the screen and film to selectively expose different portions of the film to radiation exteriorly of the casing.

The dosimeter is usable in a method for determining the level of radiation from an electronic apparatus having a plurality of radiation-emitting surfaces such as a home television receiver. The method comprises the steps of placing the dosimeter containing unexposed radiation sensitive film adjacent to one radiation-emitting surface of the apparatus. A portion of the film is then exposed to radiation from the surface for a predetermined time interval. The dosimeter is then successively placed adjacent to the remaining radiation emitting surfaces and other portions of the film are exposed to radiation therefrom for a predetermined time interval. The film is then developed and the dosage of radiation received by each exposed portion is measured. This dosage is compared with a standard to determine whether the radiation from the apparatus is within safe limits.

Figure 1:
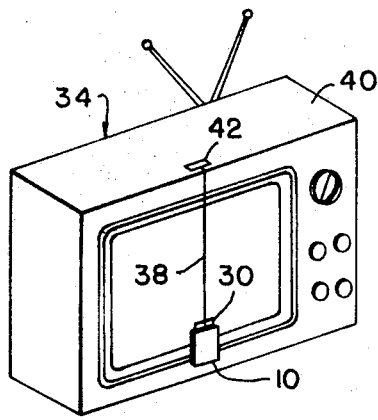
FIG. 1 is a view in perspective of a television receiver with a dosimeter in accordance with one embodiment of the present invention hung thereon illustrating the method of measuring radiation from the receiver.
Figures 2, 3:
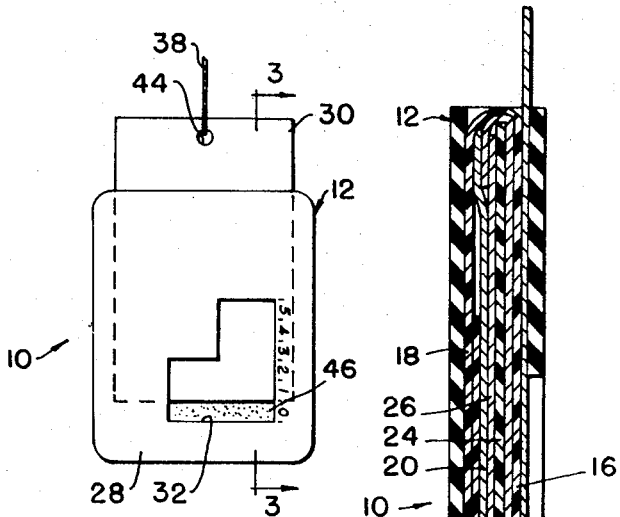
FIG. 2 is a front elevational view of the dosimeter.
FIG. 3 is a sectional view taken substantially along the line 3—3 of FIG. 2 looking in the direction of the arrows.

Referring first to the embodiment illustrated in FIGS. 1-3, it will be noted that the dosimeter 10 includes an open-topped casing 12. The casing 12 is preferably fabricated of material such as rubber or plastic which may be a filter to radiation such as X-rays, although this is not necessary in accordance with the invention.

A film pack 14 is received within the casing 12. The film pack is a conventional unit of the type commercially marketed by several different companies, primarily for dental use. One suitable film packet is marketed by Eastman Kodak Company under the trademark "Kodak" and is termed an "Ultra-Speed Safety I Film." Other suitable film packs are marketed under the trademarks "DuPont" and "Ansco."

The film pack 14 comprises a rectangular plastic bag 16 having a flap 18 which may be lifted to withdraw or insert film. A shield 20, fabricated of a material such as lead which is impervious to X-rays, is received within the bag 16 adjacent to the rear wall thereof. A sheet of film 24 encased in a paper cover 26 is received in the bag 16 between the lead shield 20 and the front wall of the bag. The sheet of film 24 is of the type which is radiation sensitive.

A movable metallic shield 30 is received within the casing 12 between the film pack 14 and casing front wall 28. The shield 30 is slidable into and out of the casing to thereby expose the film 24 to radiation generated exteriorly and in front of the casing. The shield 30 substantially covers the entire front of the film pack 14 to thereby shield the film 24 from radiation when it is placed in front of the film. The shield 30 may be fabricated of any material capable of attenuating radiation such as aluminum, silver or steel.

Referring to FIG. 2, it will be noted that an L-shaped opening 32 is provided in the front wall 28 of the casing 12. Indicia are provided along one edge of the opening 32. The numeral "0" is provided at the lowermost portion of the opening 32. Incremental graduations then extend upwardly to the top of the opening and are numbered 1 to 5.

Use of the dosimeter 10 to measure the radiation from a television receiver 34 is illustrated in FIG. 1. In determining whether or not the radiation from a television receiver is within a safe range, it is necessary to measure radiation from the front and back, sides and bottom. It is normally not necessary to measure from front the top of the receiver. The radiation from any of these points on the television receiver must, in accordance with the standards set by the National Council on Radiation Protection and Measurements, conform with the following:

"The exposure dose rate at any readily accessible point 5 centimeters from the surface of any home television set receiver shall not exceed 0.5 milliroentgen an hour under normal operating conditions."

As shown in FIG. 1, the dosimeter 10 is hung in front of the TV receiver 34 by means of a string 38 which is secured to the top 40 of the receiver by means of adhesive tape 42. The lower end of the string is attached to the shield 30 by means of an opening 44 provided therein. The front wall 28 of the casing 12 faces the television receiver. It will be appreciated that the lead shield 20 in the rear of the dosimeter prevents exposure of the film as a result of random radiation which may be encountered during handling and mounting of the dosimeter.

Assuming that FIG. 1 represents the first measurement which is to be taken, the shield 30 is adjusted to the position illustrated in FIG. 2 at the numeral "1." This exposes a band 46 to substantially direct radiation from the front of the television receiver 34. The dosimeter 10 is retained in this position for 2 hours. In accordance with the specification of the National Council on Radiation Protection and Measurement, the exposed film should not register more than 1 milliroentgen after this period of time.

After the front of the television receiver 34 has been tested for radiation, the dosimeter 10 is successively moved to positions at the two sides of the receiver, back, and bottom. The reading on the bottom of the receiver may be accomplished merely by inserting the dosimeter 10 beneath the receiver 34. At each successive measurement, the shield 30 is moved up one graduation to expose a fresh band of the film 24. The measurements taken at the sides, back and bottom are also taken for a period of 2 hours each.

After all the measurements have been taken, the film 24 is developed in accordance with standard techniques. The degree of exposure of each of the five bands on the film is then measured with a quantitative densimeter. It will be appreciated that each of the five bands has been exposed a different total amount of time. The first band is exposed to all five positions on the receiver. The second band is exposed to four positions, the third band is exposed to three positions, the fourth band is exposed to two positions, and the fifth band is exposed to only one position.

If the first band indicates that the dose rate is less than 1 milliroentgen, then the set is deemed to be within acceptable limits because this band is a cumulative measurement of radiation from all five surfaces of the set. However, if the dosage at the first station is more than 1 milliroentgen, then the dosage at each of the stations should be determined specifically. Dosage of the fifth band may be read directly. Dosage of the fourth band is determined by subtracting the dosage of the fifth band from the fourth band to determine the specific dosage which was received at the fourth station. Similarly, the dosage of the third band may be determined by subtracting the indicated dosage of the fourth band from the indicated dosage of the third band. The same method is used for the second and first bands. If all the bands indicate a dosage of less than 1 milliroentgen, the television receiver is considered to be safe. However, if the dosage at one of the stations is more than 1 milliroentgen, then corrective action must be taken.

Figure 4:
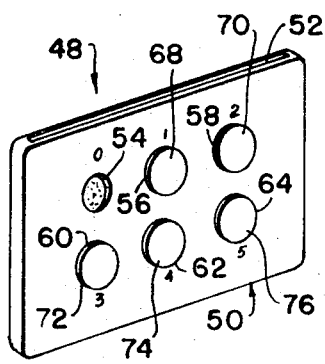
FIG. 4 is a view in perspective of another embodiment of the invention.

FIG. 4 illustrates a modification of the FIG. 2 embodiment. In FIG. 4, the docimeter 48 comprises an open-topped casing 50 constructed of a material similar to that of the casing previously described. A film pact 52 is received within the casing. Six openings 54, 56, 58, 60, 62, 64 are provided in the front wall 66 of the casing. Five plugs 68, 70, 72, 74, 76, are seated in five of the openings which are labeled successively 1 through 5. The sixth opening, which is labeled "0" does not have a plug. The plugs are fabricated of a material similar to the shield 30 of FIG. 2 which will attenuate radiation.

The dosimeter 48 may be employed to detect the degree of radiation from a television receiver in a manner similar to that described in connection with the dosimeter 10. When the dosimeter 48 is positioned at each of the five stations to check radiations, one of the plugs 68, 70, 72, 74, 76, is removed. This subjects the film behind the plug to direct radiation. It will be appreciated that the film behind the opening 54 is subjected to direct radiation at all times. After a measurement is taken at a station, the plug is replaced. The dosimeter 48 is then moved to the next station and a second plug is removed.

After the dosimeter has been used to check all five stations on a television receiver, the film is developed and the degree of radiation of the film behind each of the openings is measured. If the dosage on the film behind the opening labeled "0" is less than 1 milliroentgen, then the receiver is safe. However, if the radiation at this opening is greater than 1 milliroentgen, the film behind the other five openings should be checked to determine whether or not any station emits more than the acceptable level of radiation.

Figure 5:
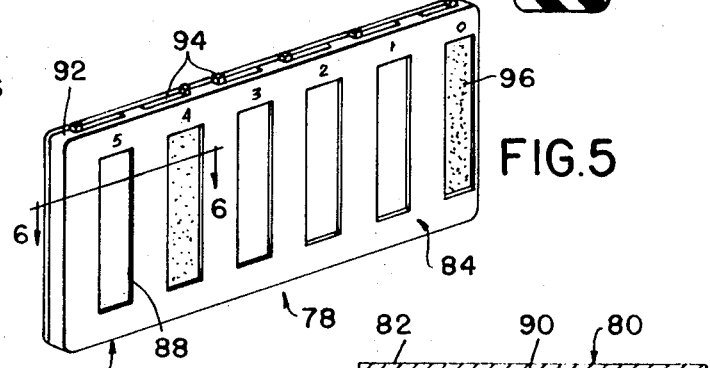
FIG. 5 is a view in perspective of a further embodiment of the invention.
Figure 6:
FIG. 6 is a sectional view taken substantially along the line 6—6 of FIG. 5 looking in the direction of the arrows.

FIGS. 5 and 6 illustrate a variation of the type of dosimeter shown in FIG. 4. The dosimeter 78 includes a casing 80. The casing 80 comprises a backwall 82 to which is secured a front wall structure wall 84. The backwall 82 is fabricated of a radiation impermeable material such as lead. The front wall structure 84 is fabricated of a radiation shield-type material which will attenuate radiation. The front wall structure 84 comprises a wall member 86 which has six spaced-apart elongated rectangular openings 88 provided therein. Vertically extending lips 90 extend rearwardly from the wall member 86 into engagement with the backwall 82. A lip 92 is provided at the top and bottom of the member. The top lip 92 has six film-receiving slots 94 in alignment with the openings 88. The slots 94 are considerably longer than the width of the openings 88 to permit movement of the film into and out of registry with the openings 88.

A sheet of film 96 is inserted through each of the slots 94 into the casing for exposure through one of the openings 88. It will be noted that these openings are labeled "0" through 5. The film 96 is completely encased in an opaque paper covering to prevent exposure by ordinary light. A tab 100 extends from each of the sheets of film 96 through the slots 94. The film may be manipulated into and out of registry of the openings 88 by means of the tabs.

The dosimeter 78 is used to check for radiation in a manner substantially similar to that described in connection with the dosimeter 48. At the first station and at each successive station, the sheet of film 96 behind the labeled "0" is moved into a position in registry with its opening 88. Then, at each station, one of the other sheets of film is moved into a position for direct exposure to radiation. After exposure, the sheet is moved out of registry with its respective opening. This process is continued until all five stations have been checked. The degree of radiation is then measured in the manner described in connection with FIG. 4 dosimeter 48.

Figure 7:
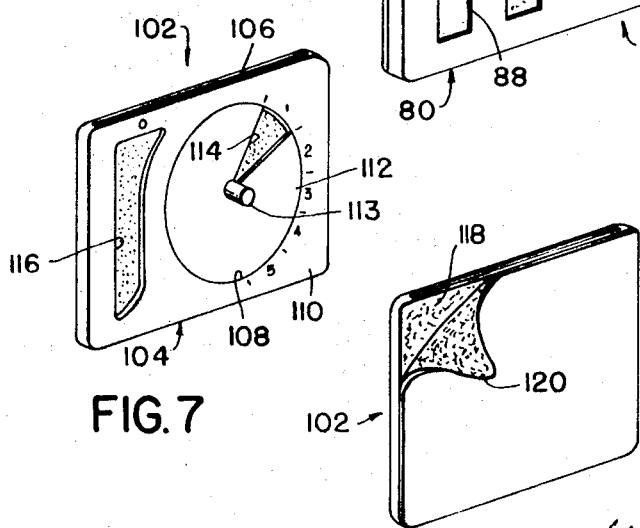
FIG. 7 is a view in perspective of another embodiment of the invention.
Figure 8:
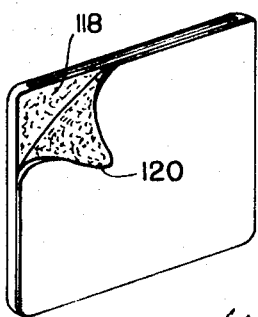
Fig. 8 is a view in perspective of the rear of the dosimeter of FIG. 7 illustrating an adhesive backing for securement of the dosimeter to a support surface.
Figure 9:
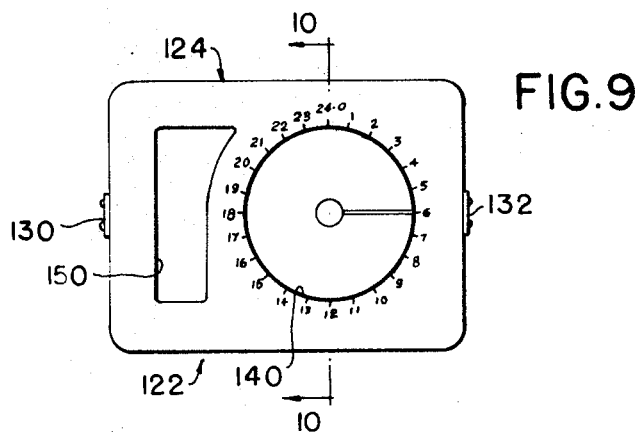
FIG. 9 is a front elevational view of another embodiment of a dosimeter employing a timing mechanism.
Figure 11:
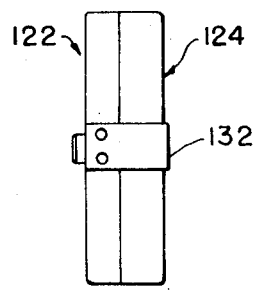
FIG. 11 is an end view of the dosimeter of FIG. 9.
Figure 10:
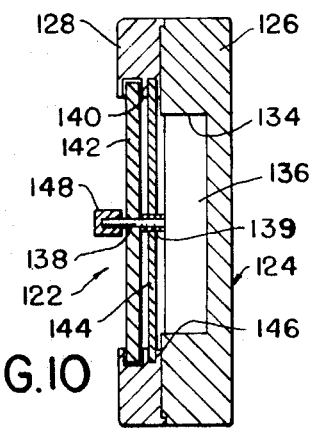
FIG. 10 is a sectional view taken substantially along the line 10—10 of FIG. 9 looking in the direction of the arrows.
Figure 12:
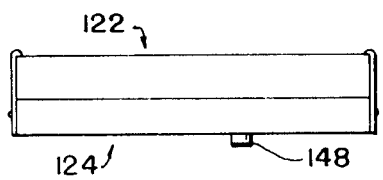
FIG. 12 is a top view of the dosimeter of FIG. 9.

A variation of the basic dosimeter is illustrated in FIGS. 7 and 8. The dosimeter 102 comprises an open-topped casing 104 similar in construction to the casing 12 described in connection with FIG. 2. A film pack 106 is received within the casing. A circular opening 108 is provided in wall 110 of the casing. A circular shield 112 is received in the opening 108 and is rotatably mounted on the casing. A knob 113 is provided for turning the shield 112. A pie-shaped opening 114 is provided in the shield 112. Indicia are provided around a portion of the periphery of the opening 108 and labeled 1 through 5. Another opening 116 is provided adjacent to the opening 108. This opening is labeled "0."

As will be noted in FIG. 8, an adhesive coating 118 is provided on the back of the dosimeter 102. A removable protective cover 120 is provided over the adhesive coating. When it is desired to use the dosimeter, the cover 120 is removed and the dosimeter is secured to a support surface by means of the adhesive coating 118.

The dosimeter 102 is used in substantially the same manner as the dosimeters previously described. The dosimeter is positioned at one station and the shield 112 is rotated to move the pie-shaped opening 114 into registry with the first of the marked-off portions on the front face of the casing. The shield 112 is successively moved to the other portions marked off on the casing at each new station. After all of the stations have been checked, the film is removed and developed. The area subjected to radiation through the opening 116 will indicate if the cumulative dosage from all of the stations is below the maximum permissible level. If it is not, then each of the pie-shaped exposed portions of the film is checked to determine which, if any, of the stations is emitting more than the acceptable amount of radiation.

FIGS. 9, 10, 11 and 12, illustrate an embodiment wherein a timer is used to expose different portions of film in timed relationship to the activities of the user of the dosimeter 122. The dosimeter 122 illustrated in these figures is primarily directed towards use by a worker in an area which may be subjected to radiation. However, this dosimeter 122 may also be used for checking apparatus which may emit different levels of radiation at different periods during its operation. In this sense, the dosimeter 122 could be used to test the safety of a home television receiver.

The dosimeter 122 includes a casing 124 which may be fabricated of hard rubber or plastic material as previously described or may be fabricated of a metallic material. The casing 124 is provided in two halves 126, 128. A pair of clamps 130, 132 are provided to normally hold the halves together. One-half 126 has a recess 134 which receives a timer mechanism 136. The timer 136 may be any of the conventional clocklike units readily available on the market. It will be noted that timer 136 is designed to operate on a 24-hour basis, that is, to make one complete revolution of the timing shaft 138 every 24 hours. As will be noted in FIG. 9, a 24-hour scale is provided on the front face of the casing 124.

The casing half 128 is provided with a circular opening 140. A disc 142 fabricated of radiation-screening material is received in the opening 140. The disc 142 is frictionally received on the shaft 138 and turns therewith. It will be noted that a radial slot 154 is provided in the disc 142.

A sheet of lead-backed film 144 is received in a notch 146 provided on the interior of casing half 128. An opening is provided in the center of the film and the film is received on a bushing 139 which does not rotate with the shaft 138. A screw cap 148 is provided on the outer end of the shaft 138 to permit separation of the casing halves 126, 128 to insert or extract film.

Another opening 150 is provided in the casing half 128 adjacent to the opening 140. There is no shield in front of the opening 150. Consequently, the film behind this opening is always subjected to direct radiation.

In operation of the dosimeter 122, a fresh sheet of film 144 is mounted in the casing by removing the clamps 130,132 and the cap 148 and separating the casing halves. The film 144 is received on the bearing 139 so that it will not turn with the shaft 138. The casing is then reassembled and the slot 154 is placed in alignment with the marking 24–0. The dosimeter 122 is then attached to the wearer or to a support surface adjacent to apparatus to be checked out. The disc 142 is then slowly rotated by the timer 136 moving the slot 154 around in an eventual 360° arc after 24 hours. Film which registers with the slot 154 at any given point in time is directly exposed to wherever radiation is present.

After usage of the dosimeter for a period of time, the film 144 is removed and developed. The dosage is measured with a densitometer. It can then be determined whether the dosage is too high at any particular period of time. In the case of use of the dosimeter 122 by a worker, the worker may keep a log of his activities so that he can tell where he was at a given time. More direct measurements can then be made in the area where he was present to determine what apparatus or under what conditions an excessive amount of radiation was emitted.

Additionally, the measurement can be used in the usual manner to determine when a worker has been subjected to more than a safe level of radiation and this information can be used to protect the personal health of the worker.

In instances of use of the dosimeter 122 in connection with apparatus, the time and conditions under which the apparatus emitted more than a safe level of radiation can be determined. The reason for this excessive radiation may be ultimately determined and corrective action taken.

Figure 14:
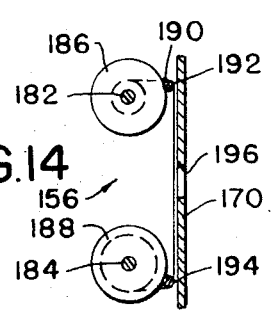
FIG. 14 is a sectional view taken substantially along the line 14—14 of FIG. 13 looking in the direction of the arrows.
Figure 13:
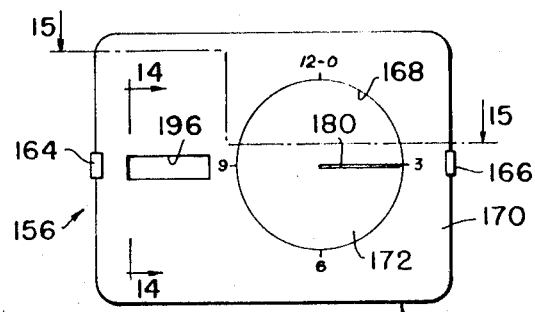
FIG. 13 is a front elevational view of a further embodiment of a dosimeter employing a timing mechanism.
Figure 15:
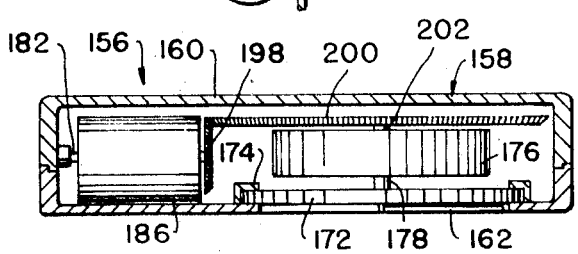
FIG. 15 is a sectional view taken substantially along the line 15—15 of FIG. 13 looking in the direction of the arrows.

A modified version of a timer-operated dosimeter 156 is illustrated in FIGS. 13–15. The dosimeter 156 includes a casing 158 which is fabricated of hard rubber or a plastic material as previously described. The casing 158 includes two casing halves 160, 162 which are held together by removable spring clamps 164, 166. A circular opening 168 is provided in the front wall 170 of the casing. A disc 172 is mounted in the opening 168 within the casing 158 by means of brackets 174. A timer mechanism 176 is mounted on the disc 172 within the casing. The timer has a shaft 178 which extends through the disc 172 and carries, on the outer end thereof, a dial pointer 180. Indicia are provided on the front face of the casing around the opening 168 indicating time. As will be noted, the indicia runs from "0" to "12" in the fashion of an ordinary clock face. The timer thus functions in the manner of a clock.

A pair of spaced-apart shafts 182, 184, are rotatably mounted within the casing 158 in suitable bearing structures. The shafts 182, 184 carry spools 186, 188 upon which is wound a roll of radiation sensitive film 190. The back of the film 190 is coated with a radiation impermeable material such as lead. The front face of the film is coated with paper or other material which is opaque to ordinary light. The film is fed over a pair of rollers 192, 194 so that a portion thereof is parallel with the inner face of the casing wall 170. An opening 196 is provided in the casing wall 170 in registry with the film.

The shaft 182 carries a bevel gear 198 on the outer end thereof. The gear 198 meshes with a bevel gear 200 which is carried by a shaft extension 202 of the timer 176. Consequently, as the timer causes the shaft 202 to rotate, the shaft 182 and spool 186 are driven in timed relationship thereto. This draws the film 190 past the opening 196 where it is subjected to direct radiation from any apparatus or other mechanism in the area.

The dosimeter 156 is used in a manner substantially identical with use of the dosimeter 122. It may be positioned either in front of a mechanism, or worn by a worker. After the film 190 has been exposed, it is developed to determine the degree of radiation at any particular point in time. The level of radiation dosage will indicate whether or not the apparatus or area was safe at the time the film was exposed.

The film packet and holder units have been described as including a radiation impervious backing such as a lead sheet. The use of such a backing sheet is desirable but not required. A film packet which does not have a lead backing, such as Kodak Personal Monitoring Film Type 3, has been tried with success.

The use of the dosimeter as a personal dosimeter without a timer, that is, a unit such as the FIG. 2 or 4 embodiments, is also possible. The user merely exposes a new section of film at predetermined time intervals or when he changes his location. This is of great advantage in tracing where or when a nuclear accident occurred. One useful technique is for the user to place the dosimeter at the place where he is usually located.

What I claim as my invention is:

1. A dosimeter comprising a casing, radiation sensitive film within the casing, a radiation screen in front of the film, a plurality of openings in the casing in front of the film, said screen comprising a plurality of plugs normally received in the openings, said plugs being individually removable to selectively expose different portions of the film to radiation generated exteriorly of the casing.

2. A dosimeter comprising a casing, radiation sensitive film within the casing, a radiation screen in front of the film, said screen being rotatably mounted on the casing, means to rotate the screen, said screen having aperture means therein which are moved to different positions upon rotation of the screen to selectively expose different portions of the film to radiation generated exteriorly of the casing.

3. A dosimeter as defined in claim 2, and further characterized in that a timer mechanism is carried by said casing, said timer mechanism being connected to the screen to cause timed rotation of the screen.

4. A method for manually determining by means of apparatus small enough to be hand-held the level of radiation from an electronic apparatus having a plurality of radiation emitting surfaces comprising the steps of providing a dosimeter comprising a casing small enough to be hand-held, providing radiation sensitive film within the casing, providing a radiation screen in front of the film and providing means to move one of the screen and film to selectively expose different portions of the film to radiation generated exteriorly of the casing, placing the dosimeter containing unexposed radiation sensitive film adjacent to one radiation-emitting surface thereof, manipulating the dosimeter to expose a portion of the film to radiation from said surface for a predetermined time interval, then successively placing the dosimeter adjacent to the remaining radiation-emitting surfaces and manipulating the dosimeter at each surface expose other portions of the film to radiation therefrom for predetermined time intervals, then developing the film and measuring the dosage of radiation received by each exposed portion thereof and comparing the result with a standard to determine whether the radiation from the apparatus is within safe limits.

5. The method according to claim 4, and further characterized in the step of exposing at least one portion of the film to radiation from all of the radiation-emitting surfaces for all of the time intervals, and comparing the dosage received by said portion to the minimum safe dosage from one surface to thereby ascertain whether the accumulative dosage from all of the surfaces is less than the acceptable amount of dosage from one surface.

6. The method in accordance with claim 4, and further characterized in that the electronic apparatus is a home television receiver, and measuring the radiation emitted from the front, back, sides and bottom thereof.

7. The method in accordance with claim 4, and further characterized in the step of using a single sheet of film, exposing each exposed portion thereof to the radiation of successive radiation-emitting surfaces, and then determining the radiation from each surface by subtracting the dosage of later exposed film portions from the dosage registered on earlier exposed film portions to thereby determine the exact dosage received from a particular surface.